Dec. 18, 1962 F. PEGNANI 3,068,631
ROTARY MOWER CONSTRUCTION
Filed Feb. 25, 1960 2 Sheets-Sheet 1

Frank Pegnani
INVENTOR.

BY

Dec. 18, 1962  F. PEGNANI  3,068,631
ROTARY MOWER CONSTRUCTION
Filed Feb. 25, 1960  2 Sheets-Sheet 2

Frank Pegnani
INVENTOR.

United States Patent Office 3,068,631
Patented Dec. 18, 1962

3,068,631
ROTARY MOWER CONSTRUCTION
Frank Pegnani, Powhatan Point, Ohio
Filed Feb. 25, 1960, Ser. No. 10,979
5 Claims. (Cl. 56—25.4)

This invention relates to a novel and useful rotary mower construction, and more particularly to a rotary mower construction which is adapted to have its cutter blades powered by means of a prime mover and which is provided with at least two pairs of relatively small cutter blades which form transversely overlapping cuts in the direction of travel of the mower. The present invention includes the provision of at least two pairs of driven shafts which project below the top wall of a mower frame and have driven pulleys secured to the upper portion thereof which are in alignment with each other. The driven shafts are circumferentially and equally spaced about a circle and an intermediate shaft having a driving pulley thereon is journalled for rotation about an axis extending substantially parallel to the axes of rotation of the driven shafts and is provided with a driving pulley aligned with the driven pulleys. An endless flexible member is entrained about the driven pulleys carried by the driven shafts and is inwardly deflected between adjacent driven pulleys and entrained about the driving pulley on the intermediate shaft. In this manner, a mower having a very compact plan area is formed while still maintaining the numerous advantages which result from a rotary mower having a plurality of small rotary cutting blades.

A rotary mower having a small number of rotary blades is much safer to operate inasmuch as the blades are considerably lighter and an object such as a stone or forgotten gardening tool hit by a spinning small blade is not thrown with as great a force inasmuch as the smaller cutting blades have considerably less momentum than the larger single blades utilized on rotary mowers having one rotary blade. Of course, the cutting edges of the smaller blades must be travelling at substantially the same speed as the cutting edges of a larger blade in order to properly cut the grass, but the fact remains that a smaller blade has considerably less momentum and is therefore less capable of hurtling objects such as stones and forgotten gardening tools and the like at speeds and with sufficient force whereby they can become dangerous.

It is the main object of this invention to provide a rotary mower construction equipped with a plurality of smaller rotary cutting blades whereby the mower may be operated with a minimum of possible danger connected with its operation.

A further object, in accordance with the preceding object, is to provide a novel arrangement for positioning a plurality of smaller rotary cutting blades equally and circumferentially spaced about a circle with a driving or intermediate shaft disposed within the circle and provided with a single driving pulley that is in alignment with driven pulleys secured to the driven shafts to which the small cutting blades are secured whereby an endless flexible member may be entrained about the driven pulleys secured to the driven shafts and inwardly deflected between adjacent driven pulleys and entrained about the driving pulley on the driving or intermediate shaft, so that the over-all plan area of the mower construction may be maintained at a minimum.

A final object to be specifically enumerated herein is to provide a mower construction which will conform to conventional forms of manufacture, be of simple construction and easy to operate so as to provide a device that will be economically feasible, long lasting and operable by substantially every homeowner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
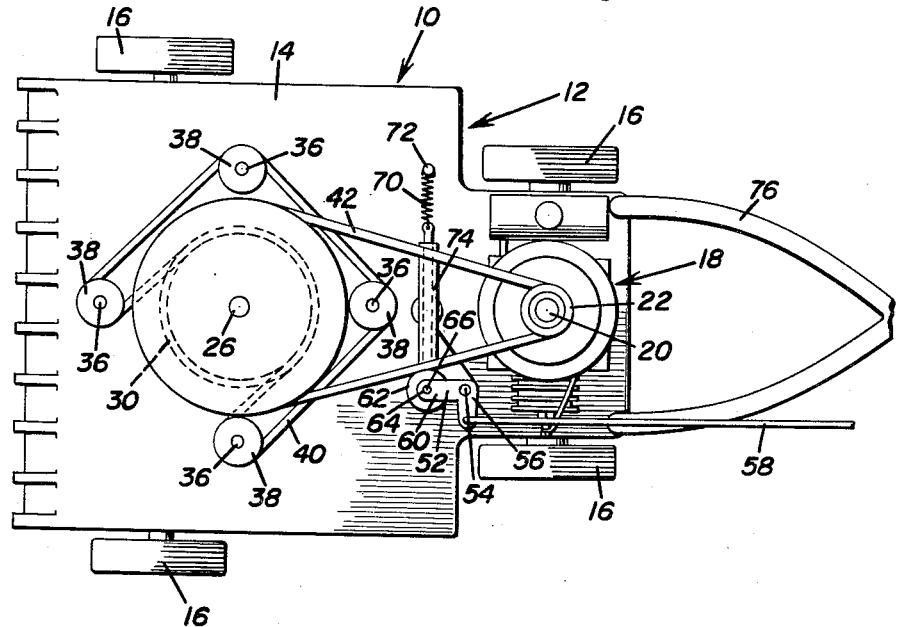
FIGURE 1 is a top plan view of the mower construction comprising the instant invention.
Figure 2:
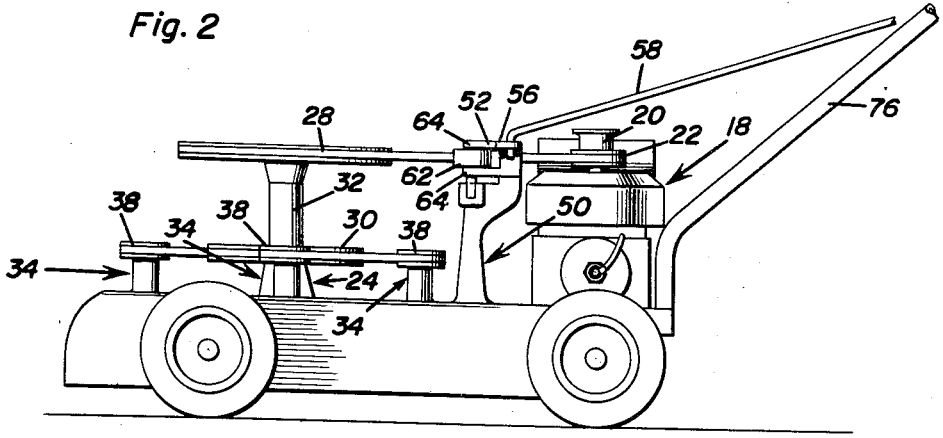
FIGURE 2 is a side elevational view of the mower construction shown in FIGURE 1.

Referring now more specifically to the drawings, the numeral 10 generally designates the mower construction comprising the instant invention which includes a frame generally designated by the reference numeral 12 including a top wall 14. A plurality of wheels 16 are suitably journaled on the frame 12 and a prime mover generally referred to by the reference numeral 18 is secured to the frame 12 in any convenient manner. The primer mover 18 may be of any conventional form found on mowers and is provided with a rotary output shaft 20 to which a driving pulley 22 is secured.

A main journal support generally designated by the reference numeral 24 is secured to the top wall 14 in any convenient manner and journals a driving or intermediate shaft 26 for rotation about a substantially perpendicularly disposed axis. A driven pulley 28 is secured to the upper portion of the intermediate shaft 26 in any convenient manner and a driving pulley 30 is secured to a lower portion of the intermediate shaft 26 in a similar manner. If it is desired, a spacer 32 may be utilized to maintain the pulleys 28 and 30 in vertically spaced relation.

A plurality of secondary journal supports generally designated by the reference numeral 34 are also secured to the top wall 14 in any convenient manner. The secondary journal supports 34 are circumferentially and equally spaced about a circle and each journals a driven shaft for rotation about an axis substantially parallel to the axis of rotation of the intermediate or driving shaft 26. Each of the driven shafts 36 has a driven pulley 38 secured theret which is aligned with the driving pulley 30 secured to the intermediate shaft 26. It will be noted that the intermediate shaft 26 is disposed within the circle about which the driving shafts 36 are disposed and that an endless flexible member 40 is entrained about the driven pulleys 38 and is inwardly deflected between two adjacent driven pulleys 38 and entrained about the driving pulley 30. Additionally, an endless flexible member 42 is entrained about the driving and driven pulleys 22 and 28.

With particular attention directed now to FIGURES 3 and 4 of the drawings it will be noted that the lower ends of the driven shafts 36 project below the top wall 14 and each has a relatively flat and elongated cutter blade 44 removably secured thereto by means of a threaded fastener 46. It is to be noted that the lower ends of the driven shafts 36 are provided with diametrically reduced threaded end portions (not shown) on which the threaded fasteners 46 are secured. Each of the cutter blades 44 is provided with cutting edges 48 about its entire periphery whereby four cutting edges are formed with only two being used at a time. The other two cutting edges may be used when the cutter blades 44 are removed and replaced in an inverted position.

A support standard generally designated by the reference numeral 50 is also secured to the top wall 14 and has a bell-crank 52 pivotally secured to its upper end by means of pivot shaft 54. One arm 56 of the bell-crank 52 has an operating rod 58 secured thereto and the other arm 60 is bifurcated and has a roller 62 journalled for rotation between the furcations 64 thereof by means of pivot pin 66. The roller 62 is thus mounted for movement toward and away from the endless flexible member 42 and is resiliently urged toward a position engaging and tensioning the endless flexible member 42 by means of an operating arm 68 to which one end of an expansion spring 70 is secured with the other end of the expansion spring 70 being secured to the top wall 14 as at 72. A suitable hollow support 74 is secured to the top wall 14 of the frame 12 in any convenient manner which slidably receives and guides the operating arm 68. It is to be noted that the end of the rod 58 remote from the bell-crank 52 is to be operatively connected to suitable retaining means (not shown) secured to the handle 76 for adjustably positioning the rod 58.

Figure 3:
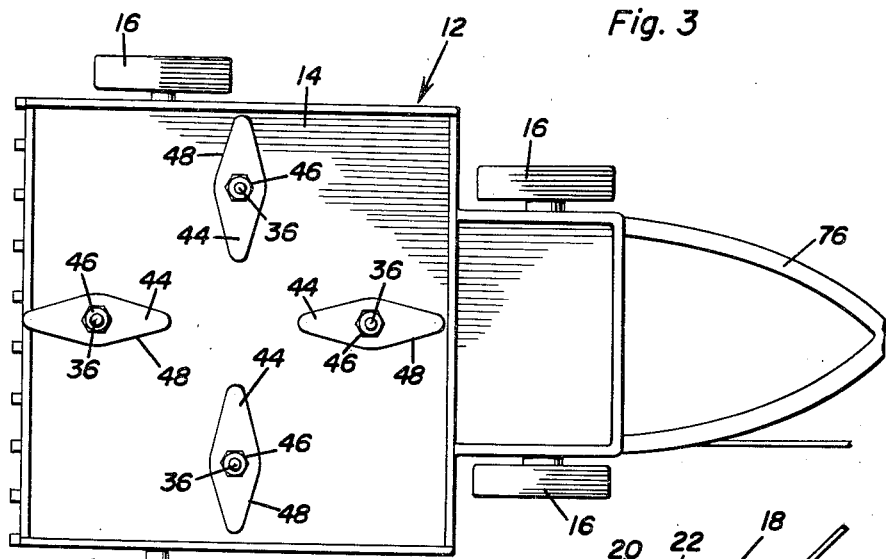
FIGURE 3 is a bottom plan view of the mower construction.
Figure 4:
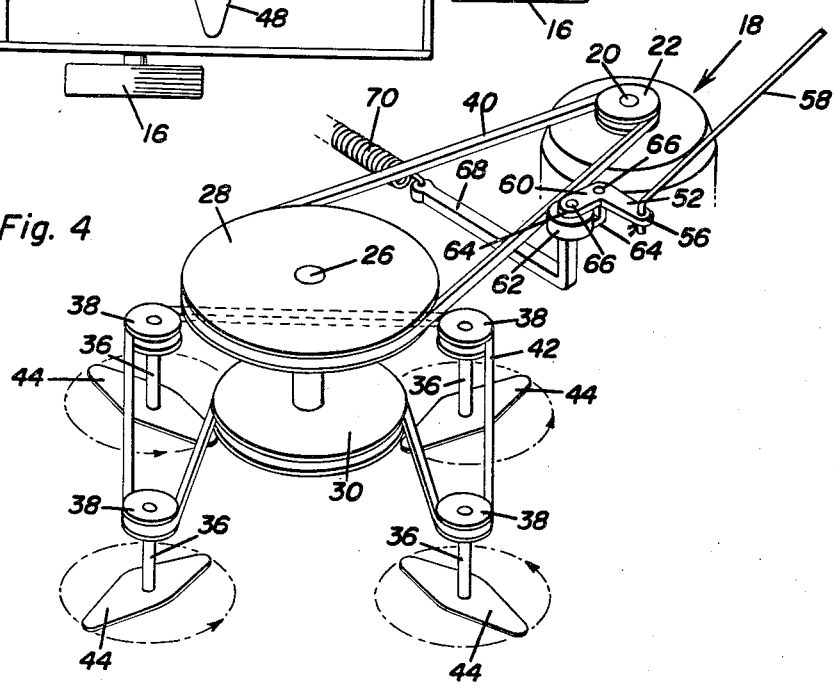
FIGURE 4 is a diagrammatic perspective view of the moving parts of the mower showing the manner in which the prime mover is operatively connected to each of the rotary blades.

With particular attention directed to FIGURES 1 and 3 of the drawings it will be noted that one of the driven shafts 36 is positioned forwardly on the frame 12 with the two adjacent driven shafts spaced equally and laterally to opposite sides of the mower rearwardly of the forward driven shaft 36.

It is to be noted that the driving or intermediate shaft 26 is positioned substantially in the center of the circle about which the driven shafts 36 are disposed and although this exact positioning is not absolutely necessary, it is preferable that the intermediate shaft 26 be positioned approximately in the center of the circle formed by the driven shafts 36. Further, it is to be noted that the cutter blades 44 are not provided with upturned portions on their trailing edges to form a suction or vacuum above the grass being cut with the result being that grass does not accumulate beneath the top wall 14 of the frame 12 and that the grass is cut into finer pieces by the plurality of cutter blades 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary mower construction comprising a mower frame including a top wall, a plurality of supporting wheels journaled on said frame, an intermediate shaft, first journaling means on said frame journaling said intermediate shaft for rotation about an upstanding axis, at least two pairs of driven shafts, second journaling means on said frame journaling said driven shafts for rotation about upstanding axes circumferentially spaced about a circle on said top wall with the lower ends of said driven shafts projecting below said top wall, a rotary cutter blade secured to the lower portion of each of said driven shafts, the axis of rotation of said intermediate shaft lying within said circle, horizontally aligned driven pulleys secured to the upper portions of said driven shafts, a driving pulley secured to said intermediate shaft in horizontal alignment with said driven pulleys, a prime mover carried by said frame and having a rotating output shaft, means drivingly connecting the output shaft of said prime mover to said intermediate shaft, and an endless flexible member entrained about said driven pulleys and inwardly deflected between two adjacent driven pulleys and entrained about said driving pulley.

2. The combination of claim 1 including a driven pulley secured to said intermediate shaft and a driving pulley secured to said output shaft in alignment with said last mentioned driven shaft, said connecting means comprising an endless flexible member entrained about said last mentioned driving and driven shafts.

3. The combination of claim 1 wherein one of said driven shafts is positioned forwardly on said frame with the two adjacent driven shafts spaced laterally to opposite sides of a longitudinal vertical plane passing through said one driven shaft rearwardly of said one driven shaft.

4. The combination of claim 1 wherein said cutter blades are removably secured to said driven shafts and are reversible.

5. The combination of claim 1 wherein one of said driven shafts is positioned forwardly on said frame with the two adjacent driven shafts spaced laterally to opposite sides of a longitudinal vertical plane passing through said one driven shaft rearwardly of said one driven shaft, said cutter blades forming transversely overlapping cuts in the direction of travel of said mower.

References Cited in the file of this patent
UNITED STATES PATENTS

| | | |
|---|---|---|
| 2,114,096 | Noel | Apr. 12, 1938 |
| 2,134,115 | Flammang | Oct. 25, 1938 |
| 2,771,730 | True | Nov. 27, 1956 |
| 2,804,112 | Schaller | Aug. 27, 1957 |
| 2,870,592 | Swanson | June 27, 1959 |